Patented Apr. 18, 1950

2,504,630

UNITED STATES PATENT OFFICE 2,504,630

COATED SELF-STARTING WELDING ROD FOR TOUCH ARC WELDING

Henri Bienfait, Willem Pieter van den Blink, and Simon Dirk Boon, Eindhoven, Netherlands, assignors to Hartford National Bank and Trust Company, Hartford, Conn., as trustee No Drawing. Application April 7, 1947, Serial No. 739,950. In the Netherlands April 8, 1946

3 Claims. (Cl. 219—8)

In electric arc-welding with coated welding rods the rods generally are required to be struck to form the arc.

The present invention relates to coated, self-starting welding rods, in which a simple contact between the work piece and the coated welding rod is sufficient for the formation of an arc.

If the coating contains so much metal powder that it is sufficiently conductive to render striking superfluous, whilst the metal core is made accordingly thinner for a correct metal-slag ratio, the coating, owing to this high content of metal powder, has such a thickness as is necessary for touch-welding.

It has been found that with several types of coated welding rods the said increase in metal powder content of the coating necessary for making the welding rods self-starting, entails disadvantages due to "burning on one side" and "freezing" in arc-welding. By "burning on one side" is meant that when the coating does not melt evenly during welding, a greater part of the coating on one side thereof is consumed than on the other side. By "freezing" is meant that during welding, the molten metal produced by the metal core short-circuits the electric current so that the arc is extinguished and the metal solidifies. Consequently, the welding rod is "frozen" to the workpiece.

An analysis has shown that this phenomenon occurs with welding rods which have a coating of titanium dioxide. Therefore the reason for the said phenomenon was sought in the formation of a semi-conductive oxide of titanium formed by the reduction of $TiO_2$ in the coating produced by the extremely high temperature.

Semi-conducting oxides of titanium have been known in the literature and have been prepared by the reduction of titanium dioxide, $TiO_2$, at temperatures well above 1000° C., e. g. 1600° C., in an atmosphere containing hydrogen to effect partial reduction of $TiO_2$ to $TiO_x$, $x<2$. These semi-conducting oxides and their method of preparation have been completely described by Paul Ehrlich in Zeitschrift für Electrochemie 45, 1939 pages 362–370. In particular, Ehrlich has shown the existence of oxides of titanium ranging from $TiO_2$ to $TiO_{0.58}$ and has classified the oxides into separate phase systems and describes their physical characteristics.

Meyer, in Zeitschrift für Technische Physik, 16, 1935 pages 355–360 and Meyer and Nedel in Zeitschrift für Technische Physik, 18, 1937, pages 1014–1019 describe the electrical characteristics of Ehrlich's reduced titanium dioxides with tables and graphs showing the conductivity of these oxides as a function of the degree of reduction. Generally, $TiO_x$, $1<x<2$ embraces the range of semi-conductors referred to above, although in a more specific sense, the range of most interest in the above sense extends from about 1.4 to 1.99 as the values of $x$.

Because of the formation of $TiO_x$ at the melting end of the rod with an attendant maldistribution of the semi-conductive titanium oxide, too large a part of the current flowing through rod passes to the work-piece through coating rather than through the core. Consequently, the coating at the point of contact between the rod and work-piece becomes softened resulting in a "burning on one side" of the weld, a reduced arc-length and freezing of the other side of the weld.

In order to avoid this undesirable effect to occur, the coating of the welding rod is provided with a metal powder and a semi-conductive titanium oxide, $TiO_x$ $1<x<2$. Such rods are useful in touch welding, i. e. by merely touching the workpiece the arc is struck, and the undesirable side-effects discussed above are avoided in that no semi-conductive $TiO_x$ is formed during the welding operation.

This combination permits the manufacture of a suitable welding rod having a titanium oxide containing coating, whilst avoiding "burning on one side" and "freezing." In general 20% to 50% metal powder and 5% to 80% semi-conducting $TiO_x$ may be used for carrying the invention into effect.

For comparison it is pointed out that the use of iron and semi-conducting $TiO_x$, both obtained by reduction of an iron titanate compound e. g. ilmenite, is not sufficient for obtaining a self-starting welding rod, because the iron content is insufficient.

Finally, the following composition of the coating is given by way of example:

| | Parts by weight |
|---|---|
| $TiO_x$ | 25 |
| Iron powder | 40 |
| Ferromanganese | 5 |
| Calcareous spar | 5 |
| Organic material | 6 |
| Silicates | 18 |

What we claim is:

1. A coated self-starting welding rod for touch arc-welding, the coating of which comprises from 20% to 50% of iron powder and from 5% to 80% of a semi-conducting titanium oxide having the formula $TiO_x$ in which $x$ is greater than 1 and less than 2.

2. A coated self-starting welding rod for touch arc-welding, the coating of which comprises approximately 25 parts by weight of a semi-conducting titanium oxide having the formula $TiO_x$ in which $x$ is greater than 1 and less than 2, approximately 40 parts by weight of iron powder, approximately 6 parts by weight of ferromanganese, and approximately 18 parts by weight of silicates, the balance being substantially inert filler material.

3. A coated self-starting welding rod for touch arc-welding, the coating of which comprises approximately 25 parts by weight of a semi-conducting titanium oxide having the formula $TiO_x$ in which $x$ is greater than 1 and less than 2, approximately 40 parts by weight of iron powder, approximately 6 parts by weight of ferromanganese, approximately 18 parts by weight of silicates, approximately 6 parts by weight of organic material, and approximately 5 parts by weight of calcareous spar.

HENRI BIENFAIT.
WILLEM PIETER VAN DEN BLINK.
SIMON DIRK BOON.

REFERENCES CITED

The following references are of record in the file of this patent:

UNITED STATES PATENTS

| Number | Name | Date |
|---|---|---|
| 1,909,217 | Notvest | May 16, 1933 |
| 2,009,240 | Roberts et al. | July 23, 1935 |
| 1,599,056 | Lloyd et al. | Sept. 7, 1926 |

FOREIGN PATENTS

| Number | Country | Date |
|---|---|---|
| 417,195 | Great Britain | Oct. 1, 1934 |